United States Patent
Lüer et al.

(10) Patent No.: US 9,702,466 B2
(45) Date of Patent: Jul. 11, 2017

(54) SEALING ELEMENT AND VEHICLE HEATING/AIR-CONDITIONING UNIT

(75) Inventors: Armin Lüer, Blumenhagen (DE);
Oliver Strathenke, Bissendorf (DE);
Jens Meyer, Ilsede (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 1319 days.

(21) Appl. No.: 13/638,160

(22) PCT Filed: Mar. 22, 2011

(86) PCT No.: PCT/EP2011/054354
§ 371 (c)(1),
(2), (4) Date: Nov. 21, 2012

(87) PCT Pub. No.: WO2011/120844
PCT Pub. Date: Oct. 6, 2011

(65) Prior Publication Data
US 2013/0065500 A1    Mar. 14, 2013

(30) Foreign Application Priority Data
Mar. 30, 2010   (DE) .................. 10 2010 013 352

(51) Int. Cl.
*F16J 15/06* (2006.01)
*B60R 13/08* (2006.01)
(Continued)

(52) U.S. Cl.
CPC .......... *F16J 15/06* (2013.01); *B60H 1/00021* (2013.01); *B60R 13/083* (2013.01);
(Continued)

(58) Field of Classification Search
CPC .......... F16J 15/06; F16L 41/08; F16L 41/086; F16L 41/088; F16L 41/12; F16L 41/14; F16L 5/00; F16L 5/08; F16L 5/10
(Continued)

(56) References Cited

U.S. PATENT DOCUMENTS 5,243,153 A * 9/1993 Holwerda ................. F16L 5/00
181/208
7,434,814 B2 * 10/2008 Kumakura ................ F16L 5/10
16/2.1
2007/0143956 A1   6/2007 Kumakura et al.

FOREIGN PATENT DOCUMENTS

EP   1700723 A1 *  9/2006
EP   1700723 A1    9/2006
(Continued)

OTHER PUBLICATIONS

English language abstract for JP 01-289714 extracted from the PAJ database on Dec. 19, 2012, 6 pages.
(Continued)

*Primary Examiner* — Brian Glessner
*Assistant Examiner* — Adam Barlow
(74) *Attorney, Agent, or Firm* — Howard & Howard Attorneys PLLC

(57) ABSTRACT

A sealing element (10) of a deformable material for sealing an opening in a wall (16), which separates two different chambers, comprises at least one aperture (12) which is arranged in a sealing first region (20) and is designed to receive a tube (14), and a yielding second region (24) which is designed to be pressed against the wall (16), wherein the second region (24) is differentiated from the first region (20) at least in part by an indentation (22).

20 Claims, 4 Drawing Sheets

(51) Int. Cl.
    *F16L 5/10*    (2006.01)
    *F16L 5/14*    (2006.01)
    *B60H 1/00*    (2006.01)
(52) U.S. Cl.
    CPC ............ *B60R 13/0846* (2013.01); *F16L 5/10* (2013.01); *F16L 5/14* (2013.01)
(58) Field of Classification Search
    USPC ................ 277/606–609, 625, 630, 634, 637; 285/192
    See application file for complete search history.

(56) References Cited

FOREIGN PATENT DOCUMENTS

| EP | 2062785 A1 | 5/2009 |
|---|---|---|
| JP | 01-289714 A | 11/1989 |

OTHER PUBLICATIONS

International Search Report for Application No. PCT/EP2011/054354 dated Jun. 20, 2011, 4 pages.

\* cited by examiner

SEALING ELEMENT AND VEHICLE HEATING/AIR-CONDITIONING UNIT

RELATED APPLICATIONS

This application is the National Stage of International Patent Application No. PCT/EP2011/054354, filed on Mar. 22, 2011, which claims priority to and all the advantages of German Patent Application No. DE 10 2010 013352.3, filed on Mar. 30, 2010.

The invention relates to a sealing element of a deformable material for sealing an opening in a wall, in particular for sealing a tube of a vehicle heating/air-conditioning unit extending through a wall. In addition, the invention relates to a vehicle heating/air-conditioning unit with a sealing element.

A sealing element for sealing a plurality of tubes of a vehicle heating/air-conditioning unit, which extend through a deflector of the vehicle, is known for example from EP 2 062 785 A1. The sealing element is designed in the form of a sealing flange and has a rigid core which is provided on both sides with a sound-proofing material and which has special sealing components in the region of the pipe passageways. A sealing element of this type is designed in a complex manner on account of the numerous different components and is therefore awkward and costly to produce.

The object of the invention is to provide a sealing element for sealing a tube which passes through a wall opening and which can be produced in a simple and inexpensive manner.

The object of the invention is attained by a sealing element according to claim 1. The sealing element of a deformable material has at least one aperture which is arranged in a sealing first region and is designed to receive a tube, and a yielding second region which is designed to be pressed against the wall, the second region being differentiated from the first region at least in part by an indentation. The sealing element can be divided into different regions by the indentation in a simple manner, the regions having different functions allocated to them and/or the regions being designed to rest against different objects, for example the tube and the wall. As a result of the separation into different regions the respective regions can be designed in an optimum manner for their function, and the regions can perform their function substantially independently of one another. Since a sealing element according to the invention does not require either different components or an expensive production process, the sealing element is simple and inexpensive to produce. An indentation in the sense of the present invention can be a cutting, or a recess, groove or depression shaped in any way desired.

It is preferable for the indentation to be designed in such a way that the material in the two regions can be deformed in a manner independent of each other. This ensures a good sealing both on the tube and on the wall. Previously in fact, when the sealing element was clamped on the wall the transition to the tube passed through was also jointly deformed, as a result of which the sealing effect was reduced.

In particular, the regions are deformed in different directions. The first region is deformed radially to the axis of the aperture and the second one at a right angle to it.

The indentation can be designed in the form of an indentation which is not continuous (in the sense of extending through the entire thickness) in the direction of the passage of the tube. This permits a one-piece design of the sealing element.

In order to achieve a substantial decoupling of the two regions of the sealing element, the indentation can differentiate the first region completely from the second region. If the indentation extends in the form of a closed curve or in a continuous manner between two edges of the sealing element, then the two regions of the sealing element will be decoupled from each other.

It is preferable for the deformable material to be a monolithic material, in particular a foam. Since only one material is used the production is particularly simple.

It is advantageous for the material of the sealing element to be watertight and/or airtight and/or sound-proofing. In this way it is made possible for the sealing element to be produced from a single material, whereas in the case of the prior art separate components from different materials are provided for each function.

The sealing element can be designed in the form of a plate, as a result of which a geometrically advantageous sealing of a relatively large opening in the wall is achieved.

In accordance with a preferred embodiment the first region with an aperture extending in the direction of the passage is provided in order to receive the tube, the first region being surrounded on the outside by the second one.

It is possible for the second region to surround the first one on the periphery completely and for the indentation to extend in a closed manner on the periphery. In this way, the wall opening can be sealed off completely by a second sealing cutting. In addition, the indentation extending in a closed manner ensures a decoupling of the two sealing portions.

It is possible for a third region to be provided which surrounds the second one and which is bounded from the second region by a second indentation. The third region can have further functions of the sealing element allocated to it, which are thus substantially independent of the functions of the first two regions. It is also envisaged that the second region is a ring formed by a second continuous indentation, the second indentation extending in particular parallel to the first one. As a result of limiting the area of the regions, the energy required for the deformation of the region is reduced and the regions can perform sealing functions independently of one another.

It is possible for the regions to be separated by a cutting or a groove in the deformable material. This permits a simple design of the indentations.

The cutting or the groove can amount to between 10% and 90% of the thickness of the sealing element.

It is preferable for the cutting or the groove to amount to between 40% and 60% of the thickness of the sealing element.

In accordance with one embodiment the indentation or all the indentations starts or start from only one flat side of the sealing element. In this way the production of the sealing element is additionally simplified.

It is preferable for a holding opening to be provided outside the first sealing portion. This allows the sealing element to be fastened independently of the sealing function of the first region.

In addition, the invention relates to a vehicle heating/air-conditioning unit with a sealing element as described above, in which case a housing with a tube passing out of it is provided and the sealing element is mounted on the tube, it being preferable for a holding opening—into which an extension on the housing projects—to be provided in the sealing element. In this way the sealing element can be fastened directly to the vehicle heating/air-conditioning unit, as a result of which the assembly of the vehicle heating/air-conditioning unit in the vehicle is simplified. The extension on the housing improves the fastening of the sealing element in the housing.

Further features and advantages of the invention may be seen in the following description and in the accompanying drawings, to which reference is made. In the drawings.

Figure 1:
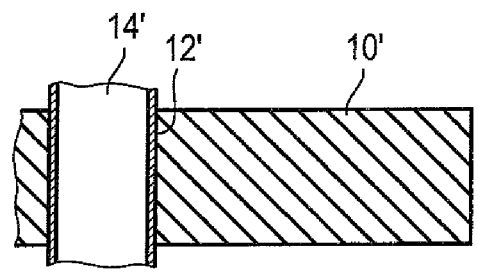
FIG. 1 is a sectional drawing of a sealing element—not assembled—according to the prior art on a tube.

FIG. 1 shows a sealing element 10' according to the prior art in a sectional view, which is designed in the form of a plate and which has an aperture 12' in which a tube 14' is received. The sealing element 10' is produced from a deformable material which rests against the tube 14' in a sealed manner.

Figure 2:
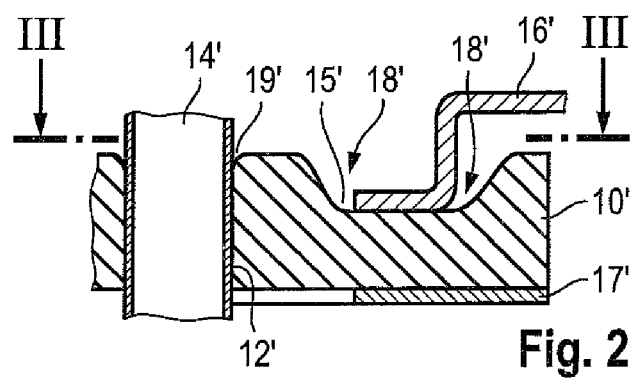
FIG. 2 shows the sealing element according to FIG. 1, which is fastened to a wall.

The sealing element 10' from FIG. 1 is shown in FIG. 2, in which a wall 16' provided with an opening 15' rests against the sealing element 10'. The sealing element 10' is compressed between a flange 17' and the wall 16', as a result of which the resilient material of the sealing element 10' is deformed. As a result of the deformation 18' in the region of the wall 16' tensile forces occur, in particular in the region of the surface of the sealing element 10' towards the wall, which have the result that the material of the sealing element 10' is also deformed in the region 19' of the tube 14', as a result of which the sealing element 10' is detached at least in part from the tube 14' projecting through the opening 15'. In this way, the sealing function of the sealing element 10' can be reduced.

Figure 3:
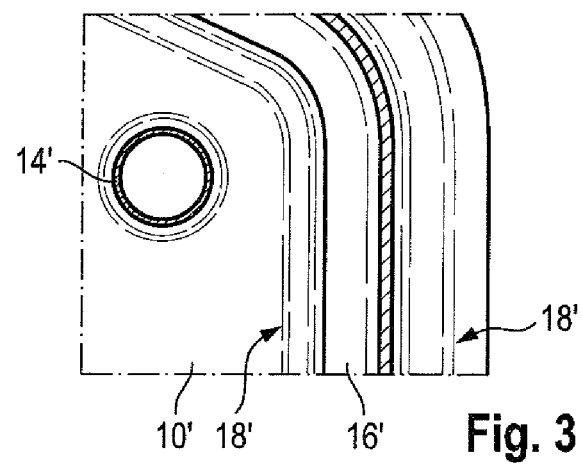
FIG. 3 is a plan view of the sealing element according to FIG. 2.
Figure 4:
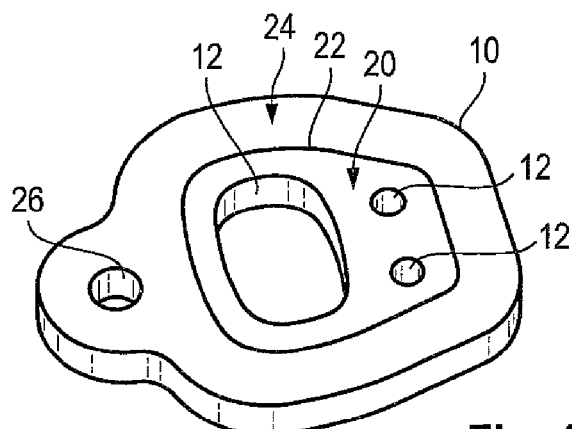
FIG. 4 is a perspective view of a sealing element according to the invention in accordance with a first embodiment.
Figure 5:
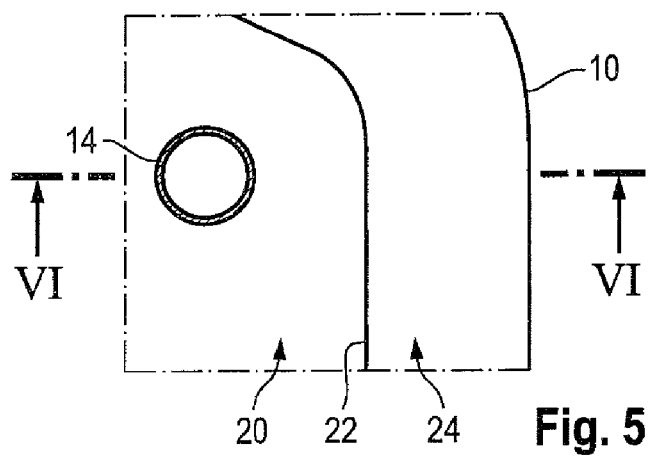
FIG. 5 is a detailed view of the sealing element according to FIG. 4 on a tube.

FIG. 3 is a plan view of the sealing element 10' in accordance with the section plane III-III in FIG. 2. FIG. 4 is a perspective view of a sealing element 10 according to the invention in accordance with a first embodiment. The sealing element 10 designed in the form of a plate has a plurality of apertures 12 for receiving tubes 14, in which case a large oval aperture 12 and two small circular apertures 12 are provided.

The three apertures 12 are arranged in a first region 20. The first region 20 is bounded by an indentation 22 in the form of a cutting in the deformable material of the sealing element 10.

The indentation 22 can be designed for example, as shown, in the form of a cutting in the material of the sealing element 10, in the form of a groove of any desired cross-section or in the form of a slot.

The indentation 22 runs around the first region 20 in a closed manner in the form of a ring.

A second, preferably annular region 24 completely surrounds the first region 20 on the periphery. The second region 24 runs around the indentation 22 in a closed manner and is separated by the latter from the region 20.

On the left-hand side of the sealing element 10 a holding opening 26 is provided in the sealing element 10 in the region of the second region 24.

In the embodiment shown in FIG. 4 a single first region 20 is provided, which surrounds all three apertures 12. Alternatively, it is also possible for an individual aperture 12 to have a separate first region 20 associated with it.

Figure 6:
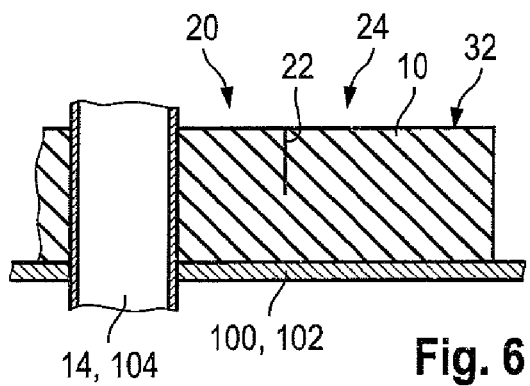
FIG. 6 is a sectional view of the sealing element according to FIG. 5 in the non-mounted state.

As is clearly evident from FIG. 6, the cutting formed by the indentation 22 extends as far as approximately half the thickness of the sealing element 10. The indentation 22 can alternatively also be designed in the form of a groove in the deformable material of the sealing element 10.

The sealing element 10 rests against a vehicle heating/air-conditioning unit 100, the housing 102 of which is shown diagrammatically. The tube 14 corresponds to a tube 104 conveying liquid passing out of the housing 102.

The sealing element 10 in the form of a plate rests flat against the housing 102 of the vehicle heating/air-conditioning unit 100.

The deformable material of the sealing element 10 is a monolithic material, as a result of which a simple production of the sealing element 10 is made possible. In the embodiment shown the deformable material is a foam which is airtight and watertight, in particular a foam with closed pores.

It is preferable for the sealing element 10 to be produced from a foam plate by stamping, the foam plate being completely severed in the region of the outer edge of the sealing element 10 and in the region of the apertures 12 or the holding opening 26 during the stamping, whereas the indentation 22 is produced in the same procedure by only partial cutting of the foam plate.

Alternatively, the indentation can also be provided in a further treatment step in the sealing element 10, or the sealing element 10 is produced in the form of moulded foam.

Figure 7:
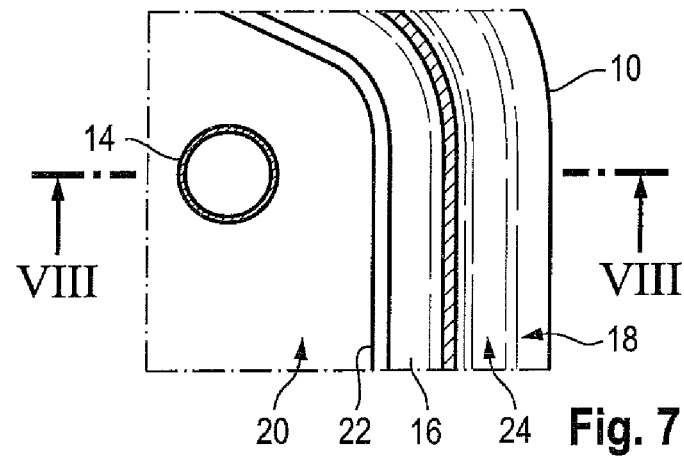
FIG. 7 is a detailed view of the sealing element according to FIG. 5, fastened to a wall.
Figure 8:
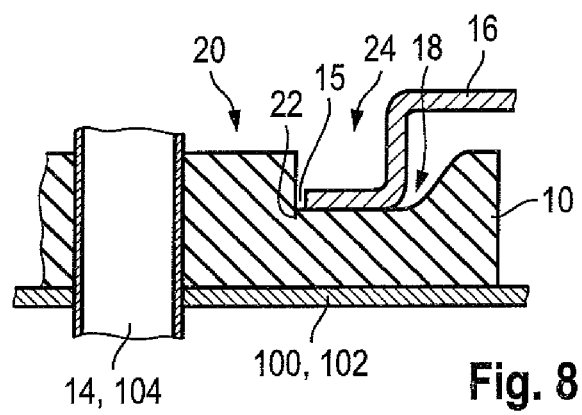
FIG. 8 is a sectional view of the sealing element according to FIG. 7 in the mounted state.
Figure 9:
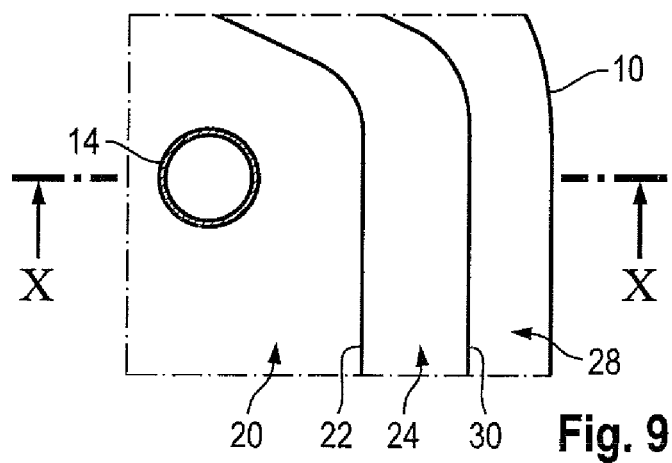
FIG. 9 is a detailed view of a sealing element in accordance with a second embodiment of the invention.
Figure 10:
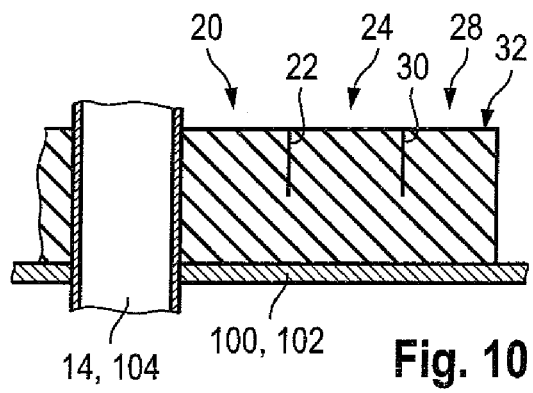
FIG. 10 is a sectional view of the sealing element according to FIG. 9 in the non-mounted state.

In FIG. 7 and FIG. 8 the sealing element 10 rests in a sealed manner against an opening in a wall 16. The wall 16 with the opening 15 thereof is for example the bulkhead of a vehicle through which a plurality of tubes of the air-conditioning unit which convey cooling fluid pass. The sealing element 10 is clamped between the wall 16 and the housing 102, so that the sealing element 10 is deformed.

As is clearly evident from FIG. 8, the second region against which the wall 16 rests is deformed by the wall 16. As a result of the indentation 22 the second region 24 can be pressed as far as the depth of the indentation 22, without the deformation 18 of the second region 24 influencing the first region 20. The sealing element 10 thus rests with the first region 20 completely against the tubular tube 14. A notch as in region 19' as shown in FIG. 2 does not occur. In this way an optimum sealing function of the sealing element 10 in the two regions 20, 24 is made possible. The indentation 22 permits an independent deformation of the two sealing regions 20, 24.

In the first region 20 the sealing element 10 is deformed in the radial direction, so that the first region 20 rests in a sealed manner against the tube 14. In contrast, the second region 24 is deformed in the axial direction by the abutting wall 16. The function of the first region 20 and the second region 24 thus differs in the direction of the deformation.

The material and/or the geometry of the sealing element 10 can be designed in such a way that the deformation properties of the sealing element 10 are different in the axial and radial directions, so that the sealing properties of the first region 20 and the second region 24 are also different.

A second embodiment of a sealing element 10 according to the invention is shown in FIGS. 9 to 12. The second embodiment is changed with respect to the first embodiment in that a second indentation 30 is provided. The second indentation 30 is made similar to the first indentation 22 in terms of its depth and extent. The second indentation 30 extends substantially parallel to the first indentation 22, as a result of which the second region 24 is bounded on one side by the first indentation 22 and on the other side by the second indentation 30. In addition, a third, outer region 28 which surrounds the second region 24 is bounded by the second indentation 30.

Figure 11:
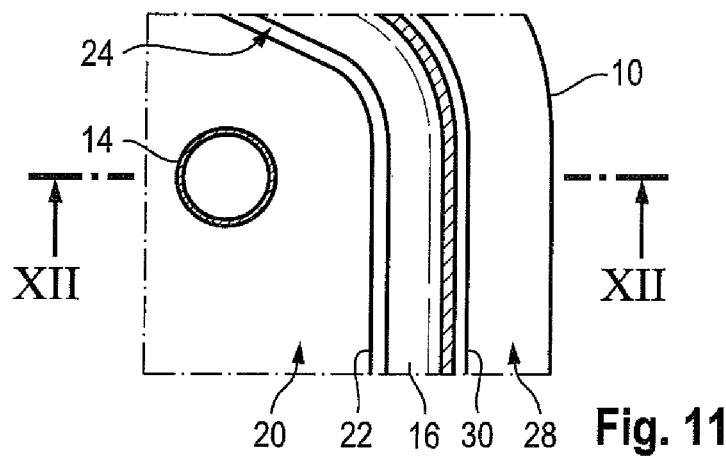
FIG. 11 is a detailed view of the sealing element according to FIG. 9, which is fastened to a wall.
Figure 12:
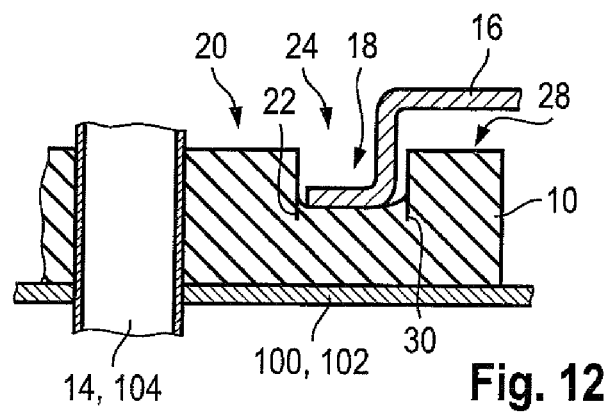
FIG. 12 is a sectional view of the sealing element according to FIG. 11.

As is clearly evident from FIGS. 11 and 12, the second region 24 is substantially restricted to the edge—designed in the form of a flange—of the opening in the wall 16, i.e. the sealing element 10 abuts only in the second region 24. As may be seen in FIG. 12, the wall 16 can deform the second region 24 independently of the first region 20 and of the third region 28.

The third region 28 can be provided in such a way that cavities between the wall 16 and the sealing element 10 are minimized in order to improve the sealing of the wall opening or in order to optimize the sound-proofing.

It is also possible for a third region 28 to be provided which surrounds the holding opening 26 in the sealing element 10.

It is preferable for the material of the sealing element 10 to be made sound-proofing.

In the two embodiments shown, all the indentations 22, 30 start in each case from the upper flat side 32 of the sealing element 10.

The housing 102 of the vehicle heating/air-conditioning unit 100 rests flat against the opposite flat side of the sealing element 10. A possible deformation of the sealing element 10 on the part of the vehicle heating/air-conditioning unit 100 is thus uniformly distributed over the entire sealing element 10, as a result of which no tensile forces occur in the plane of the sealing element 10 and so no different regions are required.

It is also of course possible for indentations 22, 30 to be provided on the two flat sides of the sealing element if this is advantageous from the technical point of view.

The invention claimed is:

1. A sealing element (10) of a deformable material for sealing an opening in a wall (16), which separates two different chambers, the sealing element (10) comprising:
   at least one aperture (12) which is formed in a sealing first region (20) and is designed to receive a tube (14), and
   a yielding second region (24), the second region (24) surrounding the sealing first region (20) on a periphery and which is designed wherein an upper flat surface (32) of the second region (24) is adapted to be pressed against the wall (16),
   wherein the second region (24) is differentiated from the first region (20) at least in part by an indentation (22) in the form of a cutting or a groove in the deformable material of the sealing element (10) starting from the upper flat surface (32) and extending between the periphery of the first region (20) and the second region (24) in an axial direction parallel to the direction of the passage of the tube (14) and to a depth relative to the upper flat surface (32), and
   wherein the indentation (22) is designed in such a way that because of the indentation (22), the two regions (20) and (22) are adapted to be deformed in a manner independent of each other, wherein the first region (20) is adapted to be deformed in a radial direction relative to the direction of the passage of the tube (14) such that the first region (20) rests in a sealed manner against the tube (14), and wherein the second region (24) is adapted to be deformed in the axial direction to the depth of the indentation (22) when the upper flat surface (32) of the second region (24) is pressed in the axial direction by the abutting wall (16).

2. A sealing element (10) according to claim 1, wherein the indentation (22) is designed in the form of an indentation (22) which is not continuous in the direction of the passage of the tube (14).

3. A sealing element (10) according to claim 1, wherein the indentation (22) differentiates the first region (20) completely from the second region (24).

4. A sealing element (10) according to claim 1, wherein the deformable material is a monolithic material.

5. A sealing element (10) according to claim 1, wherein the material of the sealing element (10) is watertight and/or airtight and/or sound-proofing.

6. A sealing element (10) according to claim 1, which is in the form of a plate.

7. A sealing element (10) according to claim 1, wherein the second region (24) surrounds the first region (20) on the periphery completely, and the indentation (22) runs around the first region (20) in the form of a ring.

8. A sealing element (10) according to claim 1, wherein a third region (28) is provided which surrounds the second region (24) and which is bounded by a second indentation (30).

9. A sealing element (10) according to claim 8, wherein the second region (24) is a ring bounded by a second continuous indentation (30), and wherein the second indentation (30) extends in a direction parallel to the direction of the first indentation (22).

10. A sealing element (10) according to claim 1, wherein the indentation (22) is a cutting in the deformable material.

11. A sealing element (10) according to claim 1, wherein the cutting or the groove amounts to between 10% and 90% of the thickness of the sealing element (10).

12. A sealing element (10) according to claim 1, wherein the cutting or the groove amounts to between 40% and 60% of the thickness of the sealing element (10).

13. A sealing element (10) according to claim 9, wherein all the indentations (22, 30) start from only one flat side (32) of the sealing element (10).

14. A sealing element (10) according to claim 1, wherein a holding opening (26) is provided outside the first region (20).

15. A vehicle heating/air-conditioning unit (100), with a sealing element (10) according to claim 1, wherein a housing (102) with a tube (104) passing out of the housing (102) is provided and the sealing element (10) is mounted on the tube (104).

16. A vehicle heating/air-conditioning unit (100) according to claim 15 wherein a holding opening (26) is provided outside the first region (20) in the sealing element (10).

17. A vehicle heating/air-conditioning unit (100) comprising:
   a housing (102);
   at least one tube (104) passing out of the housing (102);
   a wall (106) having an opening;

a sealing element (10) having a first region (20) and a second region (24) and an upper flat surface (32) and formed of a deformable material;

the first region (20) including at least one aperture (12) that receives a respective one of the at least one tube (14), and the second region (24) surrounding a periphery of the first region (20), the second region (24) having an upper flat surface (32), wherein the second region (24) is differentiated from the first region (20) at least in part by an indentation (22) in the form of a cutting or a groove in the deformable material of the sealing element (10) starting from the upper flat surface (32) and extending between the periphery of the first region (20) and the second region (24) in an axial direction parallel to the direction of the passage of the tube (14) and to a depth relative to the upper flat surface (32), wherein the tube (14) deforms the first region (20) in a radial direction relative to the direction of the passage of the tube (14) such that the first region (20) rests in a sealed manner against the tube (14), wherein the wall (16) is pressed against the upper flat surface (32) and deforms the second region (24) in the axial direction relative to the direction of the passage of the tube (14) to seal the opening in the wall (16), and wherein the deformation of the first region (20) in the radial direction is independent of the deformation of the second region (24) in the axial direction.

18. The vehicle heating/air-conditioning unit (100) according to claim 17, wherein the sealing element (10) further comprises:

a third region (28) which surrounds the second region (24) and which is bounded by a second indentation (30), the second indentation (30) extending between the second region (24) and the third region (28) in a direction parallel to the direction of the indentation (22), wherein the deformation of the second region (24) in the axial direction is independent of the first region (20) and the third region (28).

19. The vehicle heating/air-conditioning unit (100) according to claim 17, wherein the depth of the cutting or the groove amounts to between 10% and 90% of the thickness of the sealing element (10).

20. The vehicle heating/air-conditioning unit (100) according to claim 19, wherein the deformation of the second region (24) can be pressed as far as the depth of the indentation (22) while the first region (20) rests in the sealed manner against the tube (14).

* * * * *